Patented Nov. 15, 1949

2,487,807

UNITED STATES PATENT OFFICE 2,487,807

PROCESS FOR RECOVERING GLUTAMIC ACID

Forest A. Hoglan, San Jose, Calif., assignor to International Minerals and Chemical Corporation, a corporation of New York No Drawing. Application January 17, 1948,
Serial No. 2,962

13 Claims. (Cl. 260—527)

This invention relates to a process for the recovery of glutamic acid from raw materials containing glutamic acid or glutamic acid mother substances. More particularly the invention relates to the recovery of glutamic acid from Steffen's filtrate.

Glutamic acid has been produced by the hydrolysis of animal or vegetable proteins under either acid or alkaline conditions, and also from solutions resulting from the desugarization of sugar beet solutions by a method commonly known as the Steffen's process.

The clarified filtrate which results from the Steffen's process is known in the trade as Steffen's filtrate and consists of a dilute aqueous solution containing about 95% water and about 5% of a complex mixture of organic and inorganic compounds. The inorganic compounds consists mainly of salts of sodium, potassium and calcium, while the organic compounds include glutamic acid, glutamic acid mother substances, betaine and minor amounts of other amino acids. Several prior processes teach the hydrolysis of Steffen's filtrate under acidic conditions, the hydrolytic agents most commonly employed being hydrochloric and sulphuric acids. Among the methods which are available may be listed those described in patents issued to Tressler, Nos. 1,634,- 221 and 1,634,222; Takayama, No. 1,681,379; and Tressler, No. 1,685,758. These processes involve the preliminary concentration of so-called "thin" Steffen's filtrate (95% water) until the solution has a specific gravity of between about 1.2 and about 1.4. The preferable practice is to achieve a preliminary removal of betaine salts by the addition of either hydrochloric or sulphuric acid in the cold, crystallizing and separating betaine salts, followed by heating the resultant solution under acidic conditions in order to liberate glutamic acid from glutamic acid mother substances. Glutamic acid is recovered from the hydrolyzate by adjusting the pH of the hydrolyzate to about 3.2, the latter value being the iso-electric point of glutamic acid. Glutamic acid crystallizes from the adjusted hydrolyzates upon prolonged standing and is recovered therefrom. Two other patents issued to Ikeda, No. 1,721,820 and to Masuda, No. 1,928,840, involve a process whereby potash salts are first removed from concentrated Steffen's filtrate by the addition thereto of concentrated sulphuric acid. After crystallization and filtration of potash salts from the acidified solutions, the filtrates are heated under acidic conditions in order to liberate glutamic acid from glutamic acid mother substances, and glutamic acid is recovered from the hydrolyzates as described in the previously mentioned patents.

Among the processes which are available in the industry for the recovery of glutamic acid from alkali-hydrolyzed Steffen's filtrate may be mentioned the Masuda et al. patent, No. 1,947,563 and the Manning patent, No. 2,405,223. These processes involve the hydrolysis of concentrated Steffen's filtrate with an inorganic alkaline reagent, such as sodium hydroxide, under controlled conditions, crystallizing glutamic acid from the hydrolyzates by adjusting the pH of said hydrolyzates to about 3.2, and recovering glutamic acid therefrom as described above. A patent issued to Royal, No. 2,373,342, teaches a process whereby thin Steffen's filtrate is subjected to alkaline hydrolysis employing an inorganic alkaline reagent such as lime or sodium hydroxide, and glutamic acid is recovered from the alkaline hydrolyzates as previously described.

Glutamic acid and other nitrogenous compounds may be recovered from Steffen's filtrate by subjecting Steffen's filtrate, which has previously been heated or hydrolyzed under alkaline conditions, to the action of a cation exchange resin, as described in a patent issued to Nees and Bennett, No. 2,375,165. According to this process, glutamic acid, other amino acids and betaine contained in Steffen's filtrate are adsorbed on a cation exchange resin thereby achieving an appreciable concentration of these compounds.

It is known that the alkaline hydrolysis of either thin or concentrated Steffen's filtrate results in the formation of certain organic impurities which remain or become insoluble or colloidal in nature during the neutralization of the alkaline hydrolyzate to low pH values. These impurities have a tendency to precipitate from the hydrolyzate at a pH of about 3.2, the iso-electric point of glutamic acid, forming colloidal, flocculent or gelatinous bodies which not only contaminate the glutamic acid crystals, but also interfere substantially with the filtration of the glutamic acid crystals from the mother liquors. In order to prepare glutamic acid or glutamic acid salts of a purity sufficient to render them acceptable to the trade, it has been necessary to treat the glutamic acid or its salts, usually in aqueous solution, with large amounts of activated carbon or charcoal. The removal of the objectionable impurities often necessitates the use of prohibitively large quantities of these decolorizing media. Alternatively the glutamic acid or its salts may be subjected to a series of recrystallizations from water or mixtures of water and organic solvents, but here again such precedures are economically prohibitive. The contamination of glutamic acid by the aforementioned impurities in the crystallizing tanks is aggravated by a recycling operation usually practiced in processes involving glutamic acid recovery from Steffen's filtrate, wherein mother liquors from glutamic acid crystallizations are recycled to the evaporator, resulting in an increase in the concentration of the aforementioned objectionable impurities in the glutamic acid liquors.

It is an object of the invention to provide an improved process for the recovery of glutamic acid from Steffen's filtrate.

It is a further object of the invention to provide an improved process whereby objectionable organic impurities are removed from an alkali-hydrolyzed Steffen's filtrate.

It is a further object of the invention to provide an improved process for the purification of glutamic acid crystals or glutamic acid salts, said glutamic acid and salts having been produced by hydrolyzing Steffen's filtrate under alkaline conditions.

It is a further object of the invention to provide an improved process for the production of glutamic acid from alkali-hydrolyzed Steffen's filtrate whereby the amount of decolorizing agent normally required in such operations is greatly reduced.

It is a further object of the invention to provide an improved process for the recovery of glutamic acid from alkali-hydrolyzed Steffen's filtrate whereby the filtration of glutamic acid liquors and crystallization of glutamic acid crystals is markedly improved.

The above objects as well as others which will become apparent upon a more complete understanding of the invention which is hereinafter described are achieved by precipitating, in the presence of tannin, the organic impurities which contaminate glutamic acid, said glutamic acid having been produced by hydrolyzing Steffen's filtrate under alkaline conditions. It is preferable to employ tannin or tannic acid of a fair degree of purity, but the use of highly impure tannic acid, or crude tannins, phlobotannins and such compositions as gallotannic acid, digallic acid and others may also be employed within the scope of the invention. Tannin extracts are also applicable; for example, such extracts as may be obtained by comminution of tannin-bearing material, leaching with water and recovering the extracted solids by evaporation. The extracted material may be used as such, or it may be refined by physical or chemical treatments which are familiar to the industry. Commercial liquid extracts may contain 50 to 60% or more of water and the powdered or solid commercial extracts may contain 5 to 15% water. Synthetic tannins, for example mono- and polygalloylglucose, are also useful. Furthermore, any substance which will introduce tannins into the glutamic acid liquors under the conditions obtaining is useful as a reagent in the precipitation of organic impurities therefrom. The term "tannin" as used herein and in the appended claims is deemed to include any or all of the aforementioned compositions and equivalents thereof. It has been found that the previously described impurities which are present in an alkali-hydrolyzed Steffen's filtrate or in glutamic acid crystals which have been recovered from Steffen's filtrate which has been heated under alkaline conditions according to methods previously employed, may be substantially removed by precipitating said impurities with the aid of a small amount of tannins. At present the nature or character of these organic impurities is somewhat obscure but it has been found that the presence of tannins in glutamic acid liquors containing these impurities has a decidedly advantageous effect in that this reagent causes the precipitation of said impurities in such a condition that they may be readily removed from such glutamic acid liquors by filtration, centrifugation or other appropriate methods. This results in the formation of glutamic acid-containing liquors which, when concentrated to a suitable solids content and adjusted to a proper pH, yield a crude glutamic acid of much higher purity than has heretofore been produced from Steffen's filtrate. The removal of the aforementioned impurities by means of tannin results in an appreciable decrease in the viscosity of the glutamic acid liquors and also in the more rapid crystallization of glutamic acid from said liquors.

The amount of tannins required for the removal of the organic impurities from Steffen's filtrate liquors which have been subjected to an alkaline hydrolysis, or from solutions containing glutamic acid which has been produced by means of an alkaline hydrolysis of Steffen's filtrate, may be varied within a rather broad range. By the term "small amount of tannin" as used herein is meant not more than about 10% by weight of a tannin based on the weight of Steffen's filtrate or concentrated Steffen's filtrate so treated; usually an amount between about 0.03 and about 5.0% by weight will be adequate for any of the Steffen's filtrates being produced at the present time.

The removal of the organic impurities from Steffen's filtrate which has been subjected to hydrolysis under alkaline conditions, or from solutions containing glutamic acid which has been produced from an alkali-hydrolyzed Steffen's filtrate, may be conducted under acidic, neutral or basic conditions. However, it has been found that a pH range between about 5.0 and about 7.0 is most efficient for the removal of these impurities. At pH values above about 7.0 and below about 5.0, tannins are less effective for their intended purpose but the process is nevertheless operable outside of this particular pH range.

The tannin reagent may be added to alkali-hydrolyzed Steffen's filtrate or to solutions of glutamic acid which has been obtained from alkali-hydrolyzed Steffen's filtrate in the previously mentioned amounts either in a solid form or in aqueous solutions, for example of 10 to 20% concentration.

The precipitation of the organic impurities from alkali-hydrolyzed Steffen's filtrate at an appropriate pH, or from solutions containing glutamic acid which has been produced by alkaline hydrolysis of Steffen's filtrate, is most efficiently conducted at temperatures between about 20 and about 35° C. However, precipitation at higher or lower temperatures, for example temperatures up to about 75° C., also produces liquors which yield a crude glutamic acid of greater purity than has heretofore been achieved, although somewhat smaller amounts of colloidal or normally soluble organic impurities are removed at the higher temperature levels. Obviously temperatures below 20° may also be employed, limited only by the increase in the viscosity of the glutamic acid liquors which causes reduced efficiency in filtration.

The time of contact of a tannin with the organic impurities contained in the aforementioned glutamic acid liquors may be varied over a fairly wide range, for example between about 5 minutes and about 24 hours. Obviously the shorter contact period will be sufficient when higher percentages of tannin are employed, but a contact time between about 3 and about 17 hours is usually sufficient for a maximum precipitation of the impurities.

Tannins may be employed to precipitate the organic impurities present in an alkali-hydrolyzed Steffen's filtrate by treating either a dilute solution of said hydrolyzate (about 90% water) or a more concentrated solution, for example from 20 to 60% by weight of dry substance. At dry substance concentrations between about 40 and about 50% by weight, the precipitation and filtration of the organic impurities are quite satisfactory. It has been found that when the solids content of the glutamic acid liquor exceeds 55 or 60%, the precipitation of impurities is incomplete and is quite difficult to accomplish due to the increased viscosity of solutions containing a high percent of solids.

Tannins, in the aforementioned concentrations, may be added to dilute or concentrated Steffen's filtrate prior to a hydrolysis under alkaline conditions, to the alkaline Steffen's filtrate hydrolyzate subsequent to the hydrolysis step or to the glutamic acid liquors resulting from the neutralization or acidification of alkali-hydrolyzed Steffen's filtrate. Since it is desirable to precipitate the organic impurities in order to avoid the contamination of glutamic acid crystals which will be subsequently crystallized, it is preferable to conduct the precipitation of the impurities in such a manner as to avoid conditions which are conducive to the precipitation of substantial amounts of glutamic acid. Since the iso-electric point of glutamic acid solutions has a pH value of about 3.2, precipitation of the organic impurities with tannin should be conducted at pH values sufficiently removed from 3.2 in order to avoid co-precipitation of glutamic acid and the organic impurities. It is therefore advantageous to precipitate the impurities with tannin at pH values above about 4.0 and below about 2.0. As previously mentioned herein, the pH range in which the tannins are most efficient as precipitation reagents is between about 5.0 and about 7.0.

Not only is tannin an efficient reagent for the precipitation of organic impurities present in an alkali-hydrolyzed Steffen's filtrate, but it may also be employed in the treatment of glutamic acid which has been produced and recovered from alkaline Steffen's filtrate hydrolyzates according to the well-known procedures herein previously described. Such a process will be further illustrated by examples subsequently set forth.

In a preferred embodiment of the invention Steffen's filtrate is concentrated to a specific gravity of between about 1.2 and about 1.4. To the concentrated solution is added a small amount of tannin or tannic acid-containing composition, preferably in an amount between about 0.03 and about 5.0% by weight of the concentrated Steffen's filtrate. To this mixture is added a basic inorganic oxygen-containing compound in an amount not greater than about 10% by weight of the concentrated Steffen's filtrate, and the resulting mixture is heated for a sufficient length of time at a temperature not greater than about 90° C. in order to effect the production of glutamic acid from glutamic acid mother substances. The resulting solution is adjusted to a pH value of between about 5.0 and about 7.0 with an acidic material which is non-oxidizing under the conditions obtaining. The resulting solution is allowed to stand for a suitable length of time, for example between about ¼ hour and about 17 hours in order to permit precipitation of the organic impurities. These impurities are removed from the solution by means of filtration or centrifugation, and, after concentration and filtration, the pH of the resulting solution is adjusted to about 3.2 by means of an acidic material such as previously described, and glutamic acid is allowed to crystallize from the resulting solution.

In a further embodiment of the invention, concentrated Steffen's filtrate is subjected to alkaline hydrolysis as described above, but the tannin is added to the hydrolyzate subsequent to the hydrolysis step instead of prior thereto. The amount of tannic acid added to the hydrolyzate may be the same as described above, followed by the adjustment of the pH of the resulting mixture in a similar fashion. The separation of the organic impurities and the recovery of glutamic acid from the resulting solution are also carried out as described above.

In still a further embodiment of the invention an alkaline hydrolyzate of Steffen's filtrate is prepared as previously described and the pH of the resulting hydrolyzate adjusted to between about 5.0 and about 7.0. To the adjusted hydrolyzate is added a small amount of tannin, preferably between about 0.03 and about 5.0% by weight of the Steffen's filtrate. The resulting solution is permitted to stand for a suitable period of time, usually between about ¼ and about 17 hours, to permit precipitation of the organic impurities from the solution. The subsequent steps involving removal of the non-inorganic precipitate and recovery of glutamic acid are similar to the above described procedures.

It is customary to employ an organic or inorganic acid, for example sulphuric, hydrochloric, or acetic acids or mixtures thereof, in order to effect the adjustment of the pH of an alkaline Steffen's filtrate hydrolyzate to a value which affords efficient removal of the organic impurities by tannin, preferably to a pH between about 5.0 and about 7.0. Either concentrated or dilute acids may be employed, as the dilute character of the solutions prevents oxidation by such reagents as concentrated sulphuric acids. It is also possible to employ for pH adjustment an acid hydrolyzate of Steffen's filtrate prepared according to well-known procedures previously mentioned herein. For example, concentrated Steffen's filtrate may be heated with concentrated hydrochloric acid (34% HCl) at 125° C. for about one to four hours. The resulting insoluble impurities may or may not be removed by filtration and the resulting acidic glutamic acid solution is used to neutralize or acidify the previously described alkaline Steffen's filtrate hydrolyzates. The efficiency of tannin as a precipitating agent for the organic impurities produced both in acid and alkaline Steffen's filtrate hydrolyzates is not in the least impaired, and this particular process results in the formation of a liquor having a high concentration of glutamic acid due to the fact that smaller quantities of inorganic reagents per unit of glutamic acid are required to neutralize or acidify the alkaline hydrolyzate. The precipitation and removal of the organic impurities from combined hydrolyzates and recovery of glutamic acid from the resulting solution are conducted according to procedures outlined above. When employing this particular modification of the instant novel process, the tannins may be present during the acid hydrolysis of Steffen's filtrate, during an alkaline hydrolysis of Steffen's filtrate, or they may be added to either or both hydrolyzates subsequent to the hydrolysis step. Alternately the tannin may be added to the hydrolyzates subsequent to their combination. Any of these procedures bring about the efficient removal of the organic impurities, preferably at a pH between 5.0 and about 7.0.

In still a further embodiment of the invention, glutamic acid which has been prepared by an alkaline hydrolysis of Steffen's filtrate and recovered from the hydrolyzate according to well-known procedures previously mentioned herein, may be dissolved in an aqueous solution which contains a deficient quantity of at least one inorganic basic oxygen-containing compound. By the term "deficient quantity" is meant slightly less than one equivalent of said basic compound per mol of glutamic acid. The addition of tannin to such a solution, preferably at a pH value between about 5.0 and about 7.0, results in the precipitation of the organic impurities which are inherently present in glutamic acid which has been recovered from an alkali-hydrolyzed Steffen's filtrate. In this particular modification of the instant novel process the aforementioned amounts of tannin are also sufficient, namely between about 0.03 and about 5.0% by weight based upon the weight of the glutamic acid-containing solution. The precipitation of the impurities, removal thereof, and recovery of glutamic acid crystals from the clarified solution is similar to the methods previously described.

Among the reagents which are applicable to the alkaline hydrolysis of Steffen's filtrate, and which can be classed under the term "basic inorganic oxygen-containing compounds" are the hydroxides, carbonates and bicarbonates of such metals as sodium, potassium and calcium, as well as calcium hydroxide, ammonium hydroxide and equivalents thereof. Usually the amount of such reagents present in the hydrolyzate is not in excess of about 10% by weight based on the Steffen's filtrate.

Subsequent to the removal of the organic impurities from an alkali-hydrolyzed Steffen's filtrate or a solution containing glutamic acid which has been recovered from an alkaline Steffen's filtrate hydrolyzate, it is advantageous to evaporate the clarified solution to a point where incipient crystallization of salts occurs, which is about 90% or less of the weight of original Steffen's filtrate, in order to crystallize and separate inorganic salts from the glutamic acid liquor. If allowed to remain in the liquor, these salts crystallize and are found with glutamic acid when the pH of the liquor is adjusted to about 3.2. Following the crystallization and separation of these inorganic salt impurities, the resulting solution is acidified, usually by means of an organic or inorganic acid of the type previously described for the preliminary pH adjustment of alkaline Steffen's filtrate hydrolyzates. Here again the use of an acid-hydrolyzed Steffen's filtrate is sometimes advantageous.

As previously mentioned herein, glutamic acid may be recovered from Steffen's filtrate which has been hydrolyzed under alkaline conditions by subjecting the resulting hydrolyzate to the action of a cation exchange resin. Such a process is preferably conducted by first adjusting the pH of the alkaline liquor approximately to neutrality by carbonation $CO_2$ or alkali carbonate or bicarbonate, removing the resulting precipitated calcium carbonate by filtration, and passing the filtrate through a body of cation exchange resin. Glutamic acid and other nitrogenous compounds are adsorbed on the resin and are subsequently desorbed by loading the resin with inorganic salts or acids. While this operation results in a desirable concentration of glutamic acid, the process is somewhat hampered due to the fact that the organic impurities present in Steffen's filtrate solutions which have been hydrolyzed under alkaline conditions are also adsorbed on the cation exchange resin, thereby rendering it less efficient for the purpose intended. These resins are regenerated by treatment with dilute acids, usually sulphuric acid. It has been observed that the acid treatment does not remove sufficiently large amounts of the contaminating impurities, resulting in progressive decrease in efficiency of the cation exchange resin in this particular process. Therefore, if the alkali-hydrolyzed Steffen's filtrate solution is first subjected to the action of tannin, preferably at a pH between about 5.0 and about 7.0 and the resulting organic precipitate is removed from the solution, the ion-exchange process for the recovery of glutamic acid from Steffen's filtrate is thereby rendered much more efficient. Furthermore, the amount of acid which is required to reactivate the cation exchange resin is substantially reduced, thereby reducing the cost of such a process.

In order to more fully illustrate the nature and character of the invention, but with no intention of being limited thereby, the following examples are set forth:

*Example I*

About 500 g. of concentrated Steffen's filtrate (specific gravity about 1.32) is hydrolyzed by heating with a basic inorganic oxygen-containing compound in an amount not greater than about 10% by weight of the concentrated Steffen's filtrate. Preferably about 8% by weight of sodium hydroxide is employed in this step of the process. Hydrolysis is continued for about 2¼ hours at a temperature between about 80° and about 90° C. The hydrolyzate is cooled to about room temperature and a sufficient amount of an acidic material which is non-oxidizing under the conditions obtaining is added thereto to reduce the pH of the hydrolyzate to between about 5.0 and about 6.0. Preferably an aqueous solution of HCl is employed in this particular step. To the resulting solution is added tannin in an amount between about 0.03 and about 5.0% by weight of the concentrated Steffen's filtrate, preferably an amount between about 0.5 and about 1.0% by weight. The resulting solution is allowed to stand at a temperature not greater than about 75° C., preferably between about 20° and about 35° C. for a period of time between about ¼ hour and about 24 hours. The resulting precipitate comprising organic impurities is separated from the solution by filtration or centrifugation and the resulting solution is evaporated to about 90% of the weight of the original Steffen's filtrate. At this particular solids content, crystallization of inorganic salts occurs and these may be advantageously separated from the solution at this point. Following the crystallization and separation of salts from the glutamic acid liquor, the pH of the resulting solution is adjusted to about 3.2 with an acidic material which is non-oxidizing under the conditions obtaining, for example hydrochloric acid. The resulting liquor is permitted to stand at room temperature for several days in order to permit crystallization of glutamic acid therefrom. The glutamic acid crystals are isolated by means of filtration or centrifugation and are preferably washed with about 40 to 150% by weight of water, resulting in a glutamic acid of 90% purity or higher.

*Example II*

About 886 lbs. of a mixture consisting of concentrated Steffen's filtrate which has been subjected to an alkaline hydrolysis as described in Example I, together with the mother liquor resulting from glutamic acid purification from a previous batch, in a ratio of about one to one by weight, are placed in a suitable vessel and the pH of this solution adjusted to about 5.3. To this solution is added, with stirring, about 5.16 lbs. of tannin (about 0.6% tannin by weight based on the weight of the solution). The resulting mixture is permitted to stand for about 14 hours at room temperature and the resulting precipitated organic impurities are removed therefrom by filtration. The clear filtrate is concentrated to about 90% by weight of the original combined liquors, filtered in order to remove precipitated inorganic salts, and the pH of the resulting filtrate adjusted to about 3.2 with HCl. This solution is allowed to stand at room temperature for about five days and the resulting filtrate adjusted to about 3.2 with HCl. This solution is allowed to stand at room temperature for about five days and the resulting crude glutamic acid is recovered therefrom, preferably by means of a centrifuge. When washed with about 40 to 150% by weight of water, the glutamic acid has a purity of about 92% or higher. The glutamic acid crystals contain only about $1/30$ to $1/60$ the amount of precipitable color bodies as does glutamic acid produced from alkali-hydrolyzed Steffen's filtrate which has not been treated with tannic acid.

*Example III*

About 886 lbs. of combined Steffen's filtrate alkaline hydrolyzate and glutamic acid mother liquors, prepared as in Example II, is adjusted to a pH of about 6.8 with HCl. To the resulting solution is added about 8.8 lbs. of tannin (about 1.0% tannin by weight based on the solution). The resulting liquor is permitted to stand for about 17 hours at room temperature and the organic impurities which precipitate are removed therefrom by filtration or centrifugation. The resulting liquor is subjected to a concentration step, inorganic salts removal, and crystallization of glutamic acid as described in the above examples. The water-washed glutamic acid has a purity of about 92% or higher. The glutamic acid crystals contain 10 to 20 times less precipitable color impurities than glutamic acid crystals which are isolated from an alkaline Steffen's filtrate hydrolyzate which has not been treated with tannin.

While the above examples illustrate the addition of tannic acid as a precipitating agent for the organic impurities subsequent to adjusting the pH of an alkaline Steffen's filtrate hydrolyzate to between about 5.0 and about 7.0, this procedure is merely exemplary and tannin may be introduced at various stages of the process as previously described herein. The examples also illustrate the use of hydrochloric acid for the various pH adjustments but it is to be understood that other acidic reagents such as those previously mentioned herein, as well as acidic Steffen's filtrate hydrolyzates, may be employed in these particular steps.

Obviously the invention is not limited to the procedural details stated, but may be carried out by employing equivalent extensions and modifications of the factors recited.

As used in this description and appended claims, the terms "glutamic acid" and "monosodium glutamate" are intended to refer to the naturally occurring optically active forms which have, in the past, been designated d-glutamic acid, L(+) glutamic acid, and more recently as L-glutamic acid, together with similar designations for the corresponding monosodium salt of this type of glutamic acid.

Having thus fully described the character of the invention, what is desired to be secured by Letters Patent is:

1. A process which comprises adding a small amount of tannin to a glutamic acid-containing aqueous solution, the glutamic acid having been produced by the alkaline hydrolysis of Steffen's filtrate and containing organic impurities inherent to the said hydrolysis process, separating the resulting precipitate and recovering glutamic acid from the resulting solution.

2. A process which comprises adding a small amount of tannin to an alkaline hydrolyzate of Steffen's filtrate to precipitate the organic impurities present therein, said precipitation being conducted at a pH between about 5.0 and about 7.0, separating the precipitate from the solution and recovering glutamic acid from the resulting solution.

3. In a process for producing glutamic acid by an alkaline hydrolysis of Steffen's filtrate, the improvements comprising conducting the hydrolysis in the presence of a small amount of tannin, separating the precipitate from the hydrolyzate and recovering glutamic acid from the resulting solution.

4. In a process for producing glutamic acid by an alkaline hydrolysis of Steffen's filtrate, the improvements comprising conducting the hydrolysis in the presence of a small amount of tannin, adjusting the pH of the hydrolyzate to between about 5.0 and about 7.0 with an acidic material which is non-oxidizing under the conditions obtaining, separating the resulting precipitate therefrom and recovering glutamic acid from the resulting solution.

5. In a process for producing glutamic acid by an alkaline hydrolysis of Steffen's filtrate, the improvements comprising adding a small amount of tannin to the hydrolyzate, separating the resulting precipitate therefrom, and recovering glutamic acid from the resulting solution.

6. In a process for producing glutamic acid by an alkaline hydrolysis of Steffen's filtrate, the improvements comprising adding a small amount of tannin to the hydrolyzate, adjusting the pH of the resulting mixture to between about 5.0 and about 7.0 with an acidic material which is non-oxidizing under the conditions obtaining, separating the resulting precipitate therefrom and recovering glutamic acid from the resulting solution.

7. In a process for producing glutamic acid by an alkaline hydrolysis of Steffen's filtrate, the improvements comprising adjusting the pH of the hydrolyzate to between about 5.0 and about 7.0 with an acidic material which is non-oxidizing under the conditions obtaining, adding a small amount of tannin to the resulting solution, separating the resulting precipitate therefrom and recovering glutamic acid from the resulting solution.

8. In a process of hydrolyzing Steffen's filtrate with a basic inorganic oxygen-containing compound in an amount not greater than about 10% by weight of the Steffen's filtrate at a temperature not greater than about 90° C., adjusting the pH of the hydrolyzate to between about 5.0 and about 7.0 with an acidic material which is non-oxidizing under the conditions obtaining, the improvements comprising adding a small amount of tannin to the resulting solution, allowing precipitation of impurities to occur at a temperature not greater than about 75° C., separating the precipitate from the solution, evaporating the resulting solution at least to the point of incipient crystallization of salts, crystallizing and separating said salts therefrom, adjusting the pH of the resulting solution to about 3.2, crystallizing and separating glutamic acid from the adjusted solution.

9. In a process of separately preparing an alkaline hydrolyzate of Steffen's filtrate and an acid hydrolyzate of Steffen's filtrate which is nonoxidizing under the conditions obtaining, combining the hydrolyzates while avoiding conditions conducive to the precipitation of substantial amounts of glutamic acid, the improvements comprising adding a small amount of tannin to the combined hydrolyzates, separating the resulting precipitate therefrom, adjusting the pH of the resulting solution to about 3.2 and recovering glutamic acid therefrom.

10. A process which comprises separately preparing an alkaline hydrolyzate of Steffen's filtrate and an acid hydrolyzate of Steffen's filtrate, combining the hydrolyzates to give a mixture having a pH between about 5.0 and about 7.0, adding a small amount of tannin thereto, separating the resulting precipitate from the solution, adjusting the pH of the resulting solution to about 3.2 and recovering glutamic acid therefrom.

11. A process which comprises preparing an alkaline hydrolyzate of Steffen's filtrate, adding thereto an acid hydrolyzate of Steffen's filtrate which is nonoxidizing under the conditions obtaining and which contains a small amount of tannin, in such amounts as to give the resulting mixture a pH between about 5.0 and about 7.0, separating the resulting precipitated material from the solution, adjusting the pH of the resulting solution to about 3.2 and recovering glutamic acid therefrom.

12. A process of removing organic impurities present in crude glutamic acid produced by the alkaline hydrolysis of Steffen's filtrate, which comprises adding a small amount of tannin to a solution of said glutamic acid, separating the resulting precipitate and recovering glutamic acid from the resulting solution.

13. A process of removing organic impurities present in crude glutamic acid produced by the alkaline hydrolysis of Steffen's filtrate, which comprises adding a small amount of tannin to an aqueous solution of said glutamic acid, said solution containing at least one inorganic basic oxygen-containing compound in sufficient amount to give the resulting solution a pH between about 5.0 and about 7.0, separating the resulting precipitate from the solution and recovering glutamic acid from the resulting solution.

FOREST A. HOGLAN.

REFERENCES CITED

The following references are of record in the file of this patent:

UNITED STATES PATENTS

| Number | Name | Date |
| --- | --- | --- |
| 1,634,221 | Tressler | June 28, 1927 |
| 1,634,222 | Tressler | June 28, 1927 |
| 1,681,379 | Takayama | Aug. 21, 1928 |
| 1,685,758 | Tressler | Sept. 25, 1928 |
| 2,405,223 | Manning | Aug. 6, 1946 |

OTHER REFERENCES

Kizel et al., Chemical Abstracts, vol. 35, Col. 7427 (1941).